United States Patent
Yokoi (10) Patent No.: US 12,181,451 B2
(45) Date of Patent: Dec. 31, 2024

(54) LIQUID CHROMATOGRAPH

(71) Applicant: SHIMADZU CORPORATION, Kyoto (JP)

(72) Inventor: Yusuke Yokoi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 516 days.

(21) Appl. No.: 17/425,062

(22) PCT Filed: Jan. 28, 2019

(86) PCT No.: PCT/JP2019/002817
§ 371 (c)(1),
(2) Date: Jul. 22, 2021

(87) PCT Pub. No.: WO2020/157812
PCT Pub. Date: Aug. 6, 2020

(65) Prior Publication Data
US 2022/0099635 A1    Mar. 31, 2022

(51) Int. Cl.
*G01N 30/32* (2006.01)
*G01N 30/24* (2006.01)
(Continued)

(52) U.S. Cl.
CPC ............. *G01N 30/32* (2013.01); *G01N 30/24* (2013.01); *G01N 30/30* (2013.01);
(Continued)

(58) Field of Classification Search
CPC ........ G01N 31/00; G01N 30/84; G01N 30/74; G01N 30/86; G05B 21/00
See application file for complete search history.

(56) References Cited

U.S. PATENT DOCUMENTS

2003/0229475 A1* 12/2003 Osaka .................... G05B 15/02
702/188
2005/0125200 A1   6/2005 Osaka
(Continued)

FOREIGN PATENT DOCUMENTS

| JP | 2005-172468 A | 6/2005 |
| JP | 2017-156093 A | 9/2017 |
| JP | 2017-227491 A | 12/2017 |

OTHER PUBLICATIONS

International Search Report for corresponding Application No. PCT/JP2019/002817, dated Apr. 16, 2019.
(Continued)

*Primary Examiner* — Walter D. Griffin
*Assistant Examiner* — Cameron J Allen
(74) *Attorney, Agent, or Firm* — Renner, Otto, Boisselle & Sklar, LLP (57) ABSTRACT

A liquid chromatograph includes a plurality of units that execute each function of the liquid chromatograph, and a system controller connected to the plurality of units, wherein the system controller includes a status provider that acquires a status from any unit and provides the acquired status to a computer connected to the system controller, a data accumulator that accumulates the status to be provided to the computer in a database, and a data provider that provides the status accumulated in the database to any unit.

10 Claims, 7 Drawing Sheets

(51) Int. Cl.
*G01N 30/30* (2006.01)
*G01N 30/02* (2006.01)

(52) U.S. Cl.
CPC ............... *G01N 2030/027* (2013.01); *G01N 2030/3084* (2013.01); *G01N 2030/324* (2013.01); *G01N 2030/326* (2013.01)

(56) References Cited

U.S. PATENT DOCUMENTS

2008/0183401 A1* 7/2008 Davison ................. G01N 30/02
702/31
2017/0248562 A1* 8/2017 Nagai ............... G01N 35/00623

OTHER PUBLICATIONS

Written Opinion for corresponding Application No. PCT/JP2019/002817, dated Apr. 16, 2019, with English language machine translation.
Notice of Reasons for Refusal for corresponding Japanese Patent Application No. 2020-568902, dated Sep. 6, 2022, with English machine translation.
Office Action for corresponding Chinese Application No. 201980088820.1 dated Jul. 25, 2023, with English machine translation.

* cited by examiner

PARAMETER DATABASE

| ITEM | PARAMETER ID | VALUE |
|---|---|---|
| LIQUID SENDING PRESSURE | P0001 | 4.5 (Pa) |
| OVEN TEMPERATURE | P0002 | 24.5 (°C) |
| SAMPLING RATE | P0003 | 100 (Hz) |
| ⋮ | ⋮ | ⋮ |
| ⋮ | ⋮ | ⋮ |

FIG. 5

STATUS DATABASE

| ITEM | STATUS ID | VALUE |
|---|---|---|
| LIQUID SENDING PRESSURE | S0001 | 4.0 (Pa) |
| OVEN TEMPERATURE | S0002 | 23.0 (°C) |
| SAMPLING RATE | S0003 | 100 (Hz) |
| ⋮ | ⋮ | ⋮ |
| ⋮ | ⋮ | ⋮ |

LIQUID CHROMATOGRAPH

TECHNICAL FIELD

The present invention relates to a liquid chromatograph.

BACKGROUND ART

A liquid chromatograph includes a plurality of units such as a pump unit, an autosampler unit and a column unit. The plurality of units are connected to a device referred to as a system controller. The system controller controls each unit. For example, the below-mentioned Patent Document 1 discloses a liquid chromatograph including a system controller.

The system controller is connected to a computer via a network. An operator creates a method file in which an analysis condition is written in a computer. The method file created in the computer is transferred to the system controller. The system controller assigns parameters written in the method file to respective units in accordance with the content of the parameters to output the parameters. In each unit, setting is performed in accordance with an analysis condition written in a parameter. The analysis condition includes a temperature condition and so on.

Meanwhile, each unit outputs a current status such as its current temperature, etc. to the system controller. The system controller integrates the statuses output from respective units and transfers the statuses to the computer via the network.

[Patent Document 1] JP 2017-227491 A

SUMMARY OF INVENTION

Technical Problem

As described above, the system controller outputs a parameter to each unit and performs setting for each unit. Further, the system controller receives a status from each unit, and performs feedback control or the like with respect to each unit in accordance with the status of each unit. In a case where a new function is added to the behavior of the liquid chromatograph, a program corresponding to the new function is incorporated into the system controller. In this manner, control of each unit is left to the system controller. Each unit behaves in accordance with an instruction in response to receiving the instruction from the system controller.

Thus, a load applied to the system controller is increased. When the number of functions added to the liquid chromatograph is increased, the number of programs added to the system controller is also increased. Further, a load applied to the CPU (Central Processing Unit) of the system controller increases as the number of functions increases.

An object of the present invention is to reduce a load to be applied to a system controller in control of a liquid chromatograph.

Solution to Problem

A first aspect of the present invention relates to a liquid chromatograph that includes a plurality of units that execute each function of the liquid chromatograph, and a system controller connected to the plurality of units, wherein the system controller includes a status provider that acquires a status from any unit and provides the acquired status to a computer connected to the system controller, a data accumulator that accumulates the status to be provided to the computer in a database, and a data provider that provides the status accumulated in the database to any unit.

Advantageous Effects of Invention

The present invention can reduce a load to be applied to a system controller in control of a liquid chromatograph.

DESCRIPTION OF EMBODIMENTS (1) Overall Configuration of Liquid Chromatograph

Figure 1:
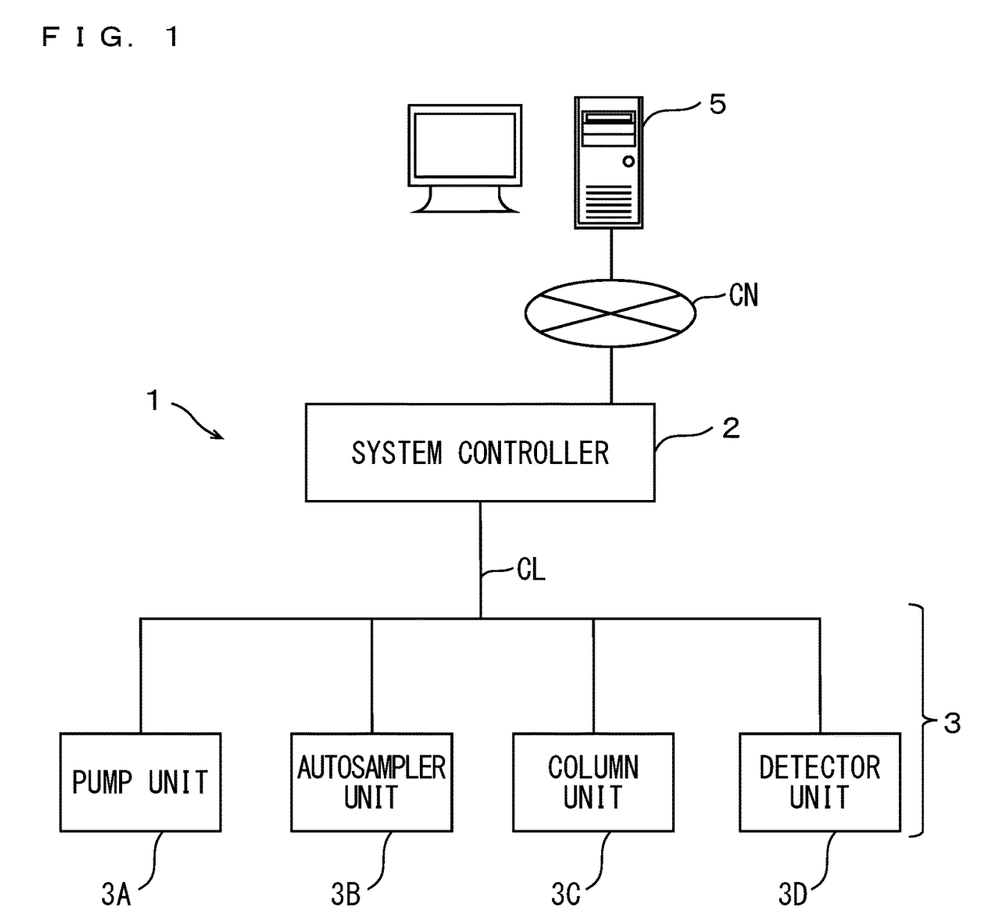
FIG. 1 is an overview of a liquid chromatograph according to the present embodiment.

The configuration of the liquid chromatograph 1 according to embodiments of the present invention will be described next with reference to the attached drawings. FIG. 1 is an overview of the liquid chromatograph 1 according to the present embodiment. The liquid chromatograph 1 includes a system controller 2, units 3 and a computer 5. The units 3 are the units that share and execute the functions included in the liquid chromatograph 1. In the present embodiment, the liquid chromatograph 1 includes a pump unit 3A, an autosampler unit 3B, a column unit 3C and a detector unit 3D as the units 3 as shown in the diagram.

The pump unit 3A includes a liquid sending pump. The liquid sending pump sends a mobile phase (an eluent) contained in a mobile phase tank to an analysis flow path of the liquid chromatograph 1.

The autosampler unit 3B is provided at a position farther downstream than the pump unit 3A. The autosampler unit 3B has a sampling flow path for holding a sample temporarily. The autosampler unit 3B can be selectively switched between an injecting mode in which the sampling flow path is incorporated into the analysis flow path of the liquid chromatograph 1 and a loading mode in which the sampling flow path is not incorporated into the analysis flow path. When the autosampler unit 3B is put in the injecting mode with a sample held by the sampling flow path, the sample is injected into the analysis flow path.

The column unit 3C is provided at a position farther downstream than the autosampler unit 3B. The column unit 3C includes a separation column and a column oven containing the separation column. The column oven includes a heater and heats the separation column. The sample that has been injected into the analysis flow path in the autosampler unit 3B flows through the separation column together with the mobile phase. The sample is separated while passing through the separation column.

The detector unit 3D is provided at a position farther downstream than the column unit 3C. In the detector unit 3D, the sample that is separated in the column unit 3C is detected. The detector unit 3D provides detection data to the system controller 2.

The system controller 2 is connected to all of the units 3 via a communication line CL. That is, the system controller 2 is connected to the pump unit 3A, the autosampler unit 3B, the column unit 3C and the detector unit 3D via the communication line CL. The system controller 2 is also connected to a computer 5 via a communication network CN.

The computer 5 is operated by an operator. The operator creates a method file in which a condition for an analysis to be performed in the liquid chromatograph 1 is written by operating the computer 5. The operator also examines a result of analysis performed in the liquid chromatograph 1 by operating the computer 5.

When the operator creates the method file by operating the computer 5, the method file is transferred to the system controller 2 via the communication network CN. The system controller 2 examines the method file and acquires a parameter to be set for each unit 3. The system controller 2 provides a parameter to be set for each unit 3 to the unit 3 for which the parameter is to be set via the communication line CL. Thus, in each unit 3, a configuration of the unit 3 is set in accordance with the parameter.

Each unit 3 provides a current status to the system controller 2 via the communication line CL. The system controller 2 integrates the statuses received from the respective units 3 and transfers the statuses to the computer 5 via the communication network CN.

The detector unit 3D provides detection data to the system controller 2 via the communication line CL. The system controller 2 transfers the detection data received from the detector unit 3D to the computer 5 via the communication network CN. The computer 5 performs various analyses in regard to a result of detection with the use of the detection data received from the system controller 2.

(2) Configuration and Behavior of System Controller

Figure 2:
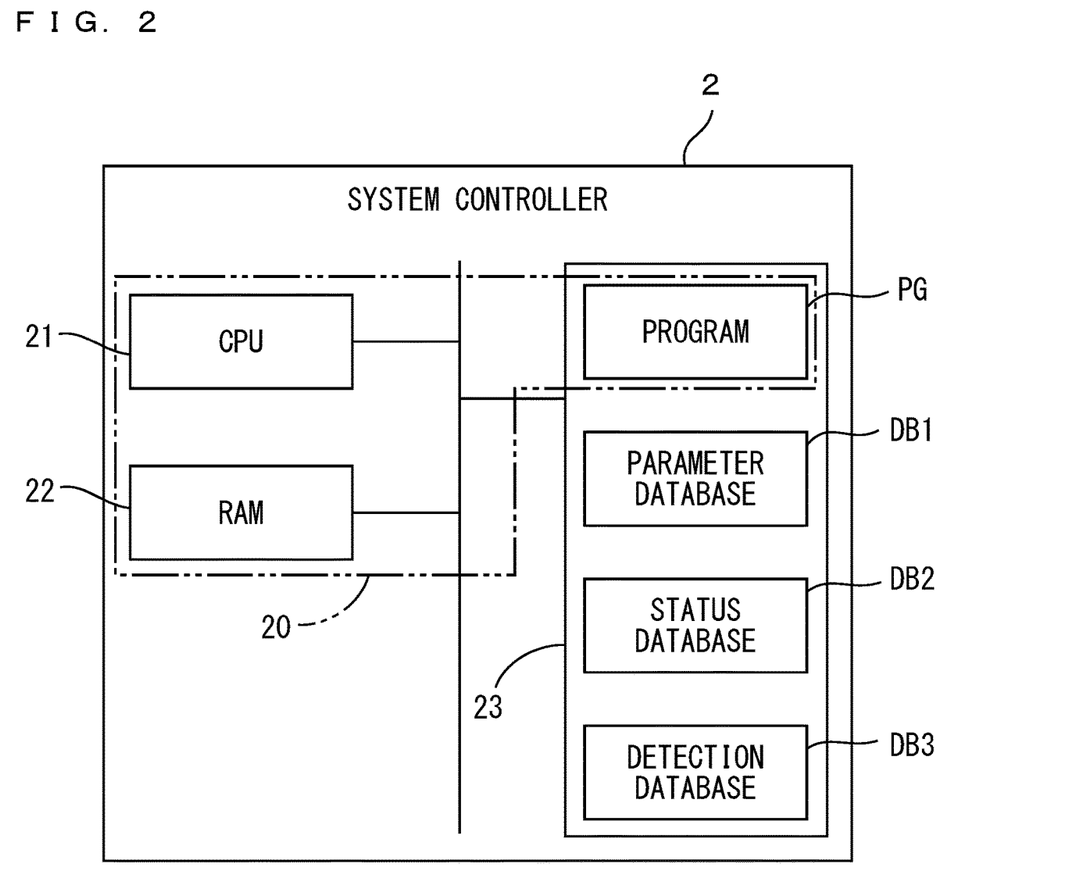
FIG. 2 is a block diagram of a system controller according to the present embodiment.

The configuration of the system controller 2 will be described next with reference to FIGS. 2 and 3. FIG. 2 is a block diagram of the system controller 2. The system controller 2 includes a CPU (Central Processing Unit) 21, a RAM (Random Access Memory) 22 and a storage device 23. A hard disc, a ROM (Read Only Memory) or the like is used as the storage device 23.

In the storage device 23, a program PG, a parameter database DB1, a status database DB2 and a detection database DB3 are saved. The CPU 21 executes the program PG while utilizing the RAM 22 as a work area. The controller 20 is implemented when the CPU 21 executes the program PG while utilizing hardware resources such as the RAM 22.

Figure 3:
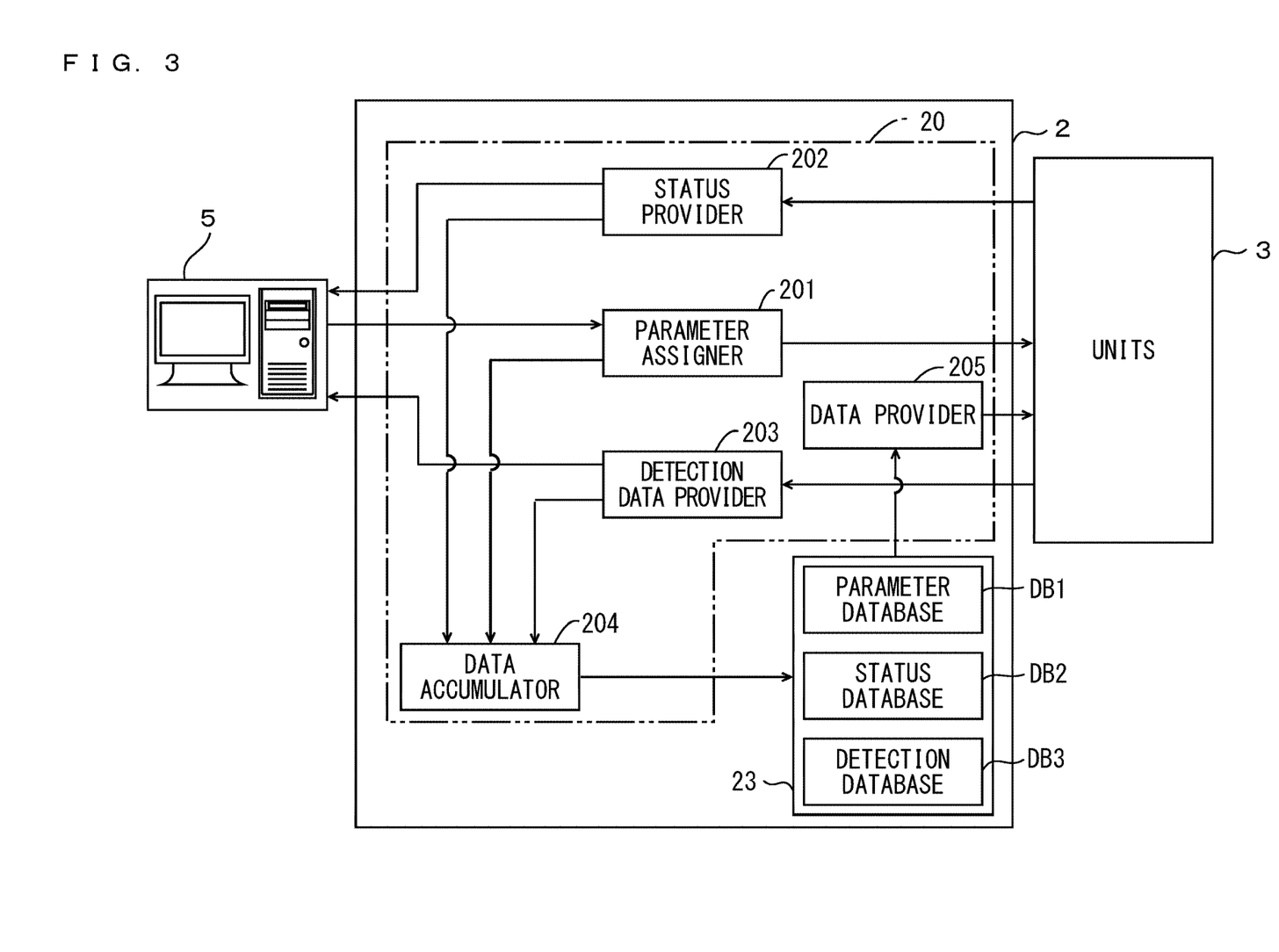
FIG. 3 is a block diagram of a controller included in the system controller.

FIG. 3 is a block diagram showing the configuration of the controller 20. The controller 20 includes a parameter assigner 201, a status provider 202, a detection data provider 203, a data accumulator 204 and a data provider 205. The parameter assigner 201, the status provider 202, the detection data provider 203, the data accumulator 204 and the data provider 205 are functions that are implemented when the CPU 21 executes the program PG while utilizing the hardware resources such as the RAM 22.

Behavior of the system controller 2 will be described with reference to FIG. 3. As described above, the operator operates the computer 5 and creates a method file in which a condition of an analysis to be performed in the liquid chromatograph 1 is written. The computer 5 transfers the method file to the system controller 2 via the communication network CN. When the system controller 2 receives the method file, the parameter assigner 201 acquires a parameter written in the method file. The parameter assigner 201 examines the parameter written in the method file and specifies a unit 3 for which the parameter is to be set. Then, the parameter assigner 201 provides the parameter to the unit 3 for which the parameter is to be set via the communication line CL. In a case where the method file includes parameters to be set for a plurality of units 3, the parameter assigner 201 assigns the respective parameters to respective units 3 for which the respective parameters are to be set.

The parameter assigner 201 also provides a parameter acquired from the method file to the data accumulator 204. The data accumulator 204 registers the acquired parameter in the parameter database DB1 stored in the storage device 23.

Figure 4:
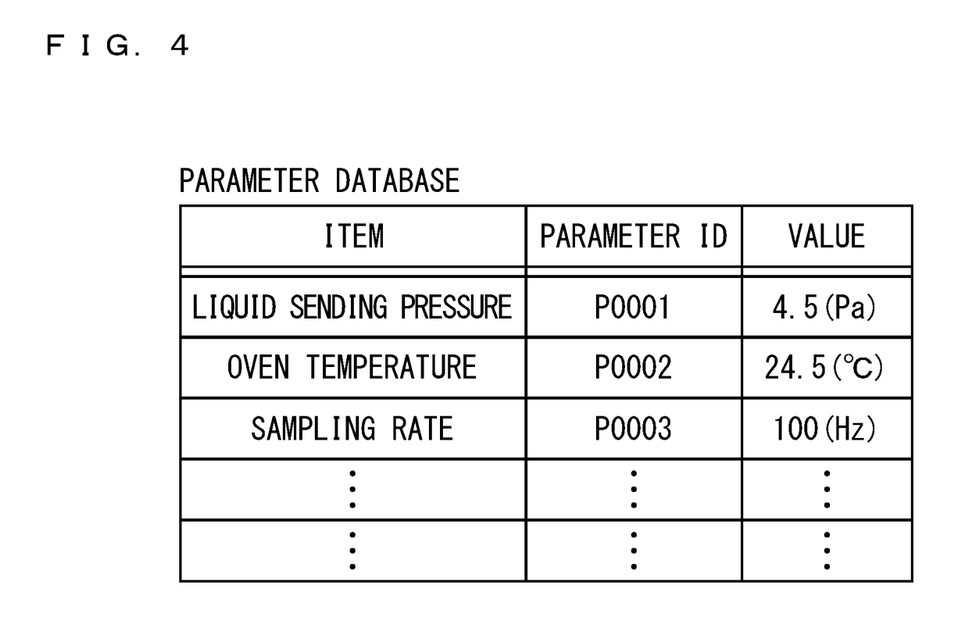
FIG. 4 is a diagram showing a parameter database.

FIG. 4 is a diagram showing the content of the parameter database DB1 stored in the storage device 23. In FIG. 4, three parameters a "liquid sending pressure," an "oven temperature," and a "sampling rate" that are registered in the parameter database DB are shown, by way of example. "P0001" is assigned to the "liquid sending pressure" as a parameter ID. Further, a value "4.5 (Pa)" is registered as the "liquid sending pressure." The "liquid sending pressure" is a parameter set for the pump unit 3A. "P0002" is assigned to the "oven temperature" as a parameter ID. Further, a value "24.5 (° C.)" is registered as the "oven temperature." The oven temperature is a parameter set for the column unit 3C. "P0003" is assigned to the "sampling rate" as a parameter ID. Further, a value "100 (Hz)" is set as the "sampling rate." The sampling rate is the rate of detection sampling in the detector unit 3D.

In this manner, when receiving the method file from the computer 5, the system controller 2 provides a parameter to each unit 3 and registers the parameter in the parameter database DB1.

As described above, each unit 3 provides a status of the unit 3 to the system controller 2 via the communication line CL. When the system controller 2 acquires the status, the status provider 202 transfers the status to the computer 5 via the communication network CN. The system controller 2 integrates statuses acquired from the plurality of units 3 and transfers them to the computer 5.

The status provider 202 also provides the statuses to the data accumulator 204. The data accumulator 204 registers the acquired statuses in the status database DB2 stored in the storage device 23.

Figure 5:
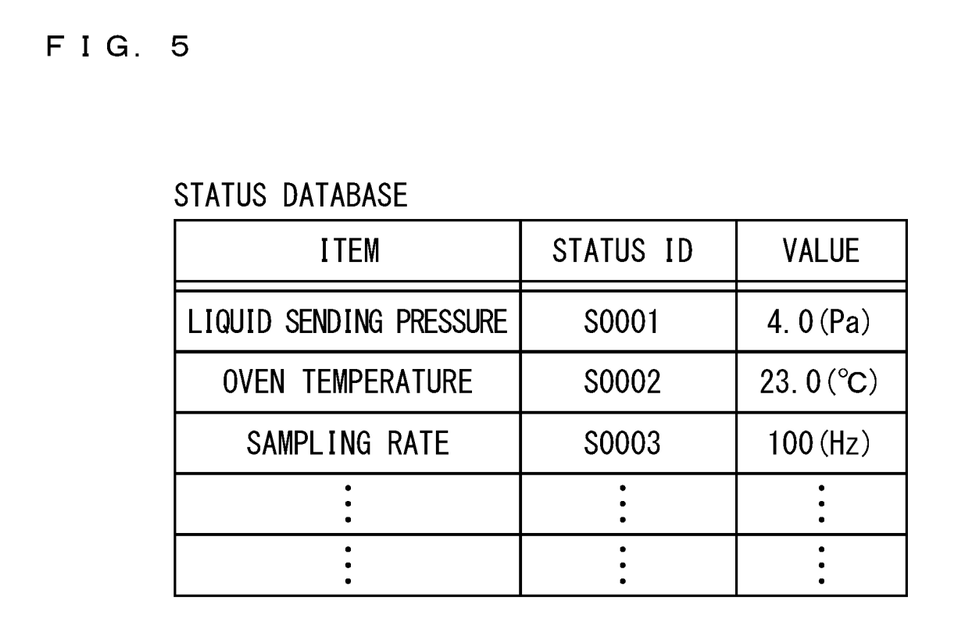
FIG. 5 is a diagram showing a status database.

FIG. 5 is a diagram showing the content of the status database DB2 stored in the storage device 23. In FIG. 5, three statuses a "liquid sending pressure," an "oven temperature," and a "sampling rate" that are registered in the status database DB2 are shown, by way of example. "S0001" is assigned to the "liquid sending pressure" as a status ID. Further, a value "4.0 (Pa)" is registered as the "liquid sending pressure." The "liquid sending pressure" is a pressure of the liquid sending pump included in the pump unit 3A. It indicates that the liquid sending pressure of the liquid sending pump is currently 4.0 Pa. "S0002" is assigned to the "oven temperature" as a status ID. Further, a value "23.0 (° C.)" is registered as the "oven temperature." The oven temperature is a temperature in the column unit 3C. It indicates that the temperature in the column oven is currently 23.0° C. "S0003" is assigned to the "sampling rate" as a status ID. Further, a value "100 (Hz)" is set as the "sampling rate." It indicates that the sampling rate of the detector unit 3D is currently set to 100 Hz.

In this manner, when acquiring a status from each unit 3, the system controller 2 provides the status to the computer 5 and registers the status in the status database DB2.

The detector unit 3D provides detection data to the system controller 2 via the communication line CL. When the system controller 2 acquires the detection data, the detection data provider 203 transfers the detection data to the computer 5 via the communication network CN. The detection data provider 203 also provides the detection data to the data accumulator 204. The data accumulator 204 registers the acquired detection data in the detection database DB3 stored in the storage device 23. In this manner, when acquiring the detection data from the detector unit 3D, the system controller 2 provides the detection data to the computer 5 and registers the detection data in the detection database DB3. In the detection database DB3, the detection data is managed by a unique ID.

As described above, the system controller 2 stores the parameter database DB1, the status database DB2 and the detection database DB3 in the storage device 23. When requiring a parameter set for another unit 3, each unit 3 can acquire the parameter set for the other unit 3 from the system controller 2. Further, when requiring a current status of another unit 3, each unit 3 can acquire the status of the other unit 3 from the system controller 2. Further, when requiring detection data acquired by the detector unit 3D, each unit 3 can acquire the detection data from the system controller 2. A unique ID (a parameter ID, a status ID and so on) of required data is registered in advance in the controller of each unit 3. Therefore, each unit 3 can acquire desired data from the parameter database DB1, the status database DB2 and the detection database DB3 by designating a unique ID.

The system controller 2 may provide the data registered in the parameter database DB1, the status database DB2 and the detection database DB3 to a pre-registered unit 3 at a predetermined point in time. Alternatively, a unit 3 that requires data of another unit 3 may provide a request for acquiring data to the system controller 2. The system controller 2 may provide data registered in a database to a unit 3 that has made a request in response to the acquiring request provided by the unit 3. Each unit 3 can specify required data by designating a unique ID.

Thus, each unit 3 can make reference to a parameter set for another unit, a status of another unit 3 or detection data and control itself in accordance with a referenced value. While each unit 3 is conventionally controlled in response to receiving a control instruction from the system controller 2, each unit 2 can behave independently in the liquid chromatograph 1 of the present embodiment. Thus, a load applied to the system controller 2 can be reduced.

Further, it is possible to reduce the number of components such as a detector by sharing a status among the units 3. For example, when utilizing a result of temperature detection included in any unit, it is not necessary for a plurality of units to have temperature detectors.

(3) Application Example 1

Figure 6:
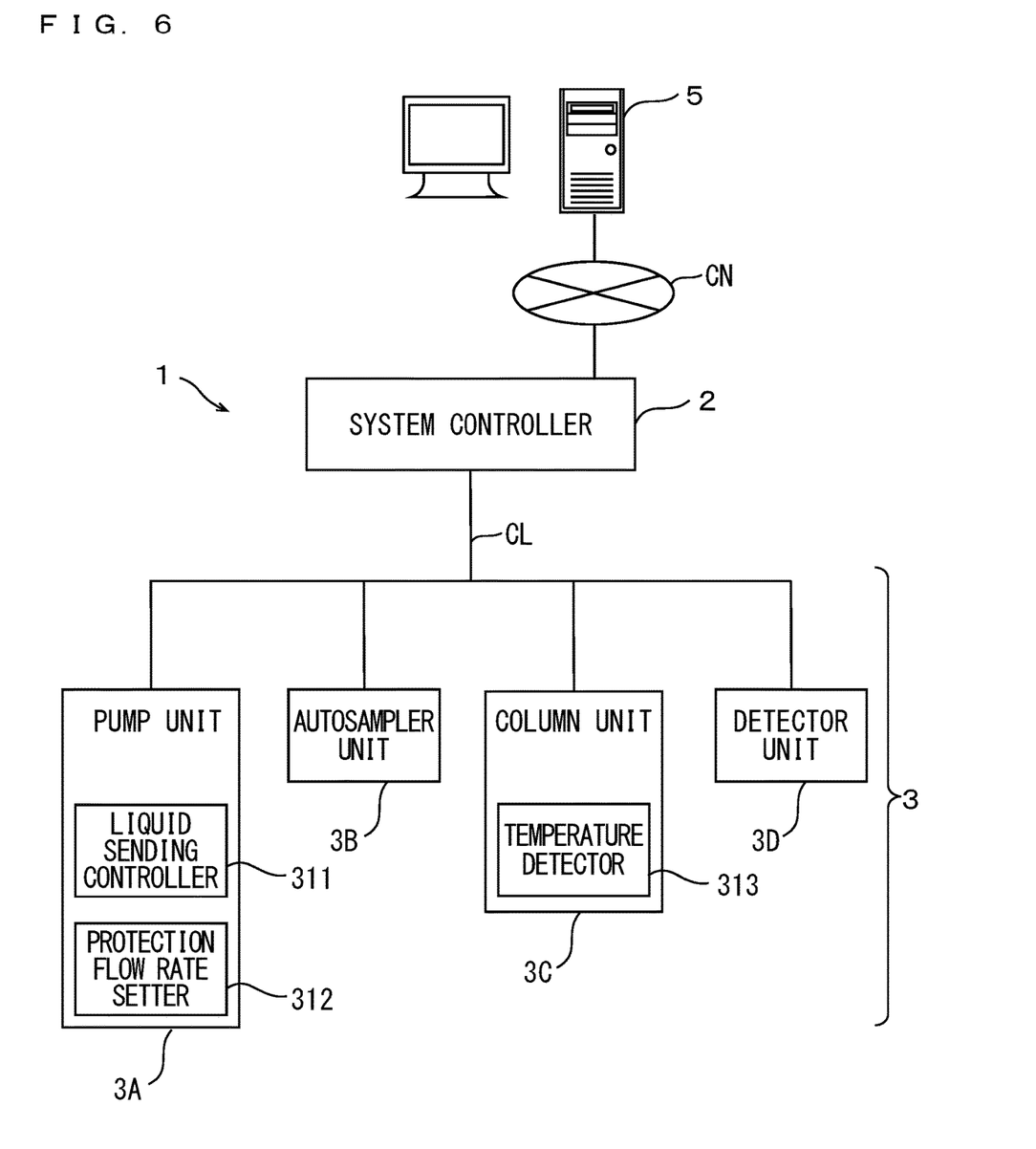
FIG. 6 is a diagram showing an application example 1 of the liquid chromatograph 1 according to the present embodiment.

An application example 1 in which the liquid chromatograph 1 of the present embodiment is utilized will be described next. In the application example 1, the configurations of a system controller 2, units 3 and a computer 5 are similar to those of the above-mentioned embodiment described with reference to FIGS. 1 to 5. In the application example 1, as shown in FIG. 6, a pump unit 3A further includes a liquid sending controller 311 and a protection flow rate setter 312. A column unit 3C further includes a temperature detector 313.

The liquid sending controller 311 controls the behavior of a liquid sending pump such that a flow rate of a mobile phase flowing through an analysis flow path is a target flow rate set by a parameter. The target flow rate is provided from the system controller 2 as a parameter. When the target flow rate is set, the protection flow rate setter 312 sets a protection flow rate that is lower than the target flow rate in order to protect a separation column. The temperature detector 313 detects a temperature in the column unit 3C.

With the above-mentioned configuration, the pump unit 3A behaves independently as described below. First, a status provider 202 acquires an oven temperature detected by the temperature detector 313 of the column unit 3C as a status. The status provider 202 transfers the oven temperature to the computer 5 as a status of the column unit 3C and provides the oven temperature to a data accumulator 204. The data accumulator 204 registers the oven temperature of the column unit 3C in a status database DB2.

Next, a data provider 205 of the system controller 2 provides oven temperature data of the column unit 3C registered in the status database DB2 to the pump unit 3A via a communication line CL. For example, the data provider 205 provides the oven temperature data to the pump unit 3A at a predetermined point in time. Alternatively, the data provider 205 receives a request for acquiring the oven temperature data from the pump unit 3A and provides the oven temperature data in response to the request.

When the pump unit 3A starts sending a mobile phase, the liquid sending controller 311 of the pump unit 3A makes reference to the oven temperature data of the column unit 3C acquired from the system controller 2. Then, the liquid sending controller 311 controls the liquid sending pump such that a flow rate of the mobile phase flowing through the analysis flow path does not exceed a protection flow rate until the temperature of the column unit 3C reaches a target temperature. Thus, the pressure of the mobile phase can be prevented from being increased before the temperature of the column unit 3C reaches an appropriate temperature, and the separation column can be prevented from being damaged.

After the oven temperature of the column unit 3C reaches the target temperature, the liquid sending controller 311 controls the liquid sending pump such that the flow rate of the mobile phase flowing through the analysis flow path is the target flow rate. In this manner, the pump unit 3A behaves independently by acquiring the status of the column unit 3C, and a load applied to the system controller 2 can be reduced.

(4) Application Example 2

Figure 7:
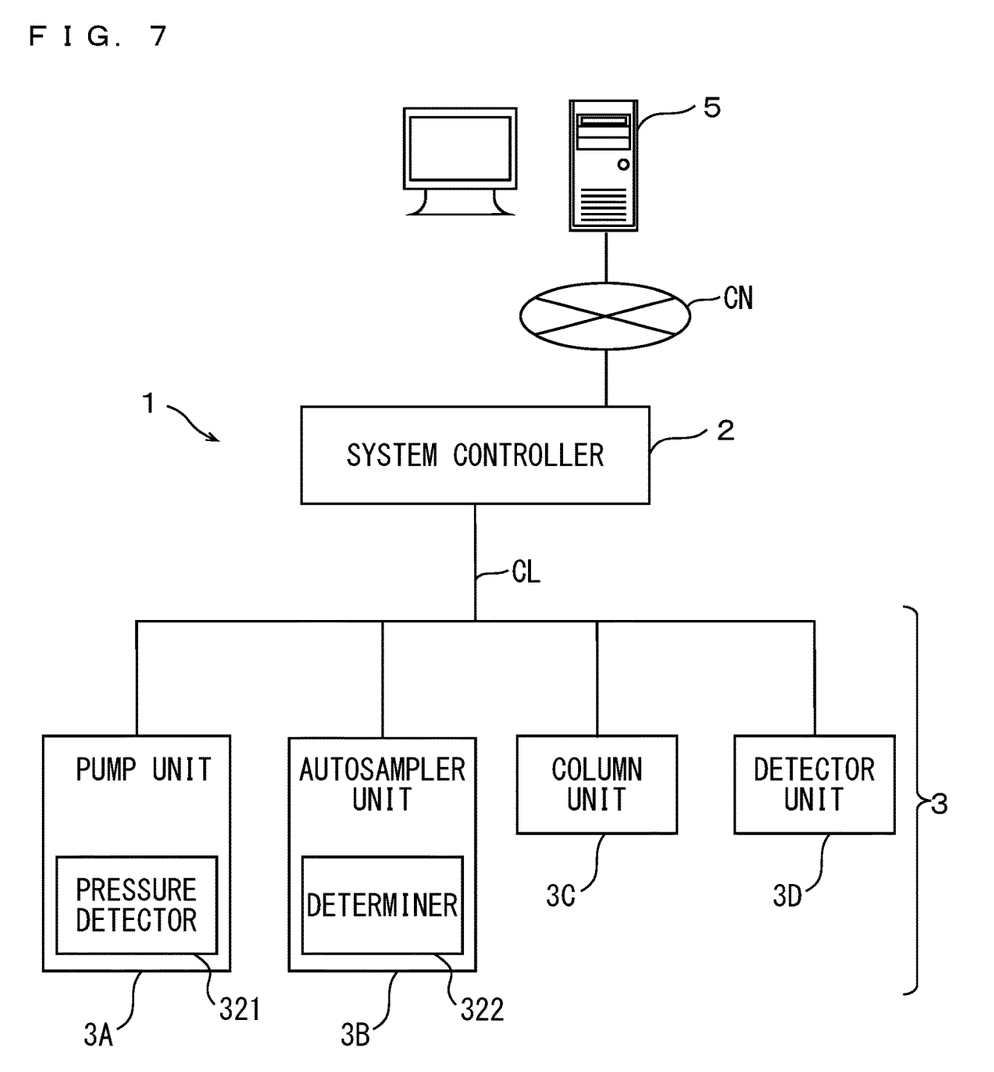
FIG. 7 is a diagram showing an application example 2 of the liquid chromatograph according to the present embodiment.

An application example 2 in which the liquid chromatograph 1 of the present embodiment is utilized will be described next. In the application example 2, the configurations of a system controller 2, units 3 and a computer 5 are similar to those of the above-mentioned embodiment described with reference to FIGS. 1 to 5. In the application example 2, a pump unit 3A further includes a pressure detector 321 as shown in FIG. 7. An autosampler unit 3B further includes a determiner 322.

The pressure detector 321 detects a liquid sending pressure at which a liquid sending pump included in the pump unit 3A sends a mobile phase into an analysis flow path. The determiner 322 obtains a variation value of the liquid sending pressure in the pump unit 3A when the autosampler unit 3B is switched between an injecting mode and a loading mode. The determiner 322 determines presence or absence of clogging in a system incorporated into the analysis flow path in the injecting mode based on the obtained variation value.

Figure 8:
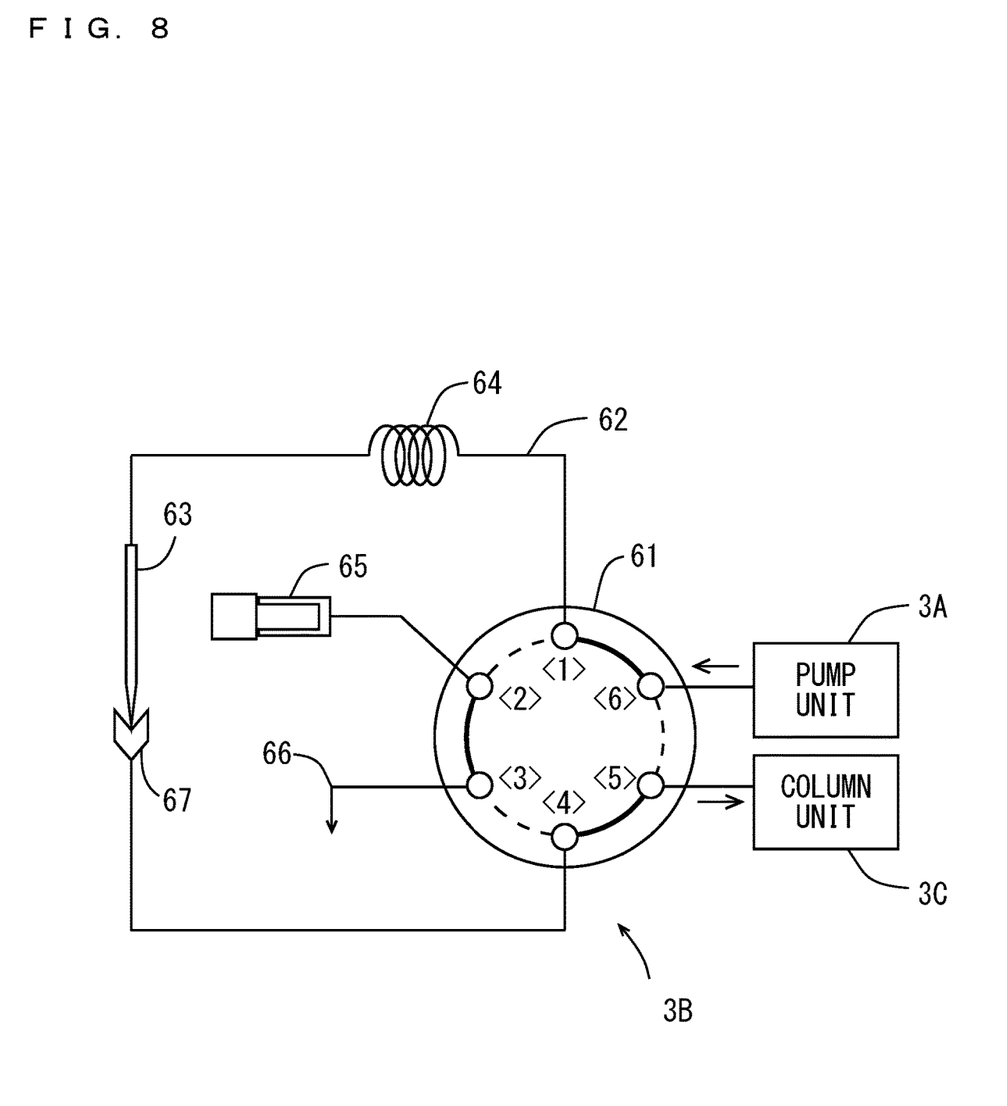
FIG. 8 is a diagram showing the configuration of an autosampler unit.

FIG. 8 is a block diagram of the autosampler unit 3B. The autosampler unit 3B includes a switch valve 61, a sampling flow path 62, a needle 63, a sampling loop 64, a syringe pump 65, a drain flow path 66 and an injection port 67.

The switch valve 61 is a multi-port valve having six ports <1> to <6>. The switch valve 61 can be switched between a first mode in which the ports <1> and <6> are connected, the ports <2> and <3> are connected and the ports <4> and <5> are connected, and a second mode in which the ports <1> and <2> are connected, the ports <3> and <4> are connected and the ports <5> and <6> are connected.

When the switch valve 61 is switched to the second mode, the ports <5> and <6> are connected. Thus, the pump unit 3A and a column unit 3C are connected to each other without the sampling flow path 62. That is, the sampling flow path 62 is not incorporated into the analysis flow path. This state is referred to as a loading mode. In the loading mode, the ports <1> and <2> are connected, and the sampling flow path 62 is connected to the syringe pump 65. The needle 63 can inject a sample from a sample container (not shown) by driving of the syringe pump 65.

When the needle 63 injects the sample from the sample container (not shown), the injected sample is held temporarily in the sampling loop 64 provided in the sampling flow path 62. After the sample is injected from the sample container, the needle 63 is moved by a moving mechanism (not shown) and is connected to the injection port 67. In this state, the switch valve 61 is switched to the first mode. Thus, the pump unit 3A, the sampling flow path 62 and the column unit 3C are connected in series. This state is referred to as an injection mode.

With the above-mentioned configuration, the autosampler unit 3B behaves independently as described below. First, a status provider 202 acquires liquid sending pressure data detected by the pressure detector 321 of the pump unit 3A as a status. The status provider 202 transfers the liquid sending pressure data to the computer 5 as the status of the pump unit 3A and provides the liquid sending pressure data to a data accumulator 204. The data accumulator 204 registers the liquid sending pressure data of the pump unit 3A in a status database DB2.

Next, a data provider 205 of the system controller 2 provides the liquid sending pressure data of the pump unit 3A registered in the status database DB2 to the autosampler unit 3B via a communication line CL. For example, the data provider 205 provides the liquid sending pressure data to the autosampler unit 3B at a predetermined point in time. Alternatively, the data provider 205 receives a request for acquiring the liquid sending pressure data from the autosampler unit 3B and provides the liquid sending pressure data in response to the request.

Then, the determiner 322 obtains a variation value of the liquid sending pressure data when the autosampler unit 3B is switched between the injection mode and the loading mode, based on the liquid sending pressure data acquired from the system controller 2. The determiner 322 determines presence or absence of clogging in a system incorporated into the analysis flow path in the injecting mode based on the obtained variation value. That is, presence or absence of clogging in the sampling flow path 62 incorporated into the analysis flow path and a flow path around the sampling flow path 62 in the injecting mode is determined.

The determiner 322 presents warning to an operator in a case where determining that clogging is present in the system incorporated into the analysis flow path. For example, the determiner 322 lights up a warning lamp provided at a casing of the autosampler unit 3B. Alternatively, the determiner 322 notifies the system controller 2 of presence of clogging. The system controller 2 displays warning on a monitor of the system controller 2. In this manner, the autosampler unit 3B behaves independently by acquiring the status of the pump unit 3A, and a load applied to the system controller 2 can be reduced.

(5) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, a collective term of the database including the parameter database DB1, the status database DB2 and the detection database DB3 is an example of a database in claims. In the above-mentioned embodiment, the parameter ID or the status ID is an example of a unique ID.

As each of constituent elements recited in the claims, various other elements having configurations or functions described in the claims can be also used.

(6) Other Embodiments

In the above-mentioned embodiment, the parameter database DB1, the status database DB2 and the detection database DB3 manage registered data by a unique ID. As another method, each database may manage registered data by a character string such as a keyword.

In the above-mentioned embodiment, the liquid chromatograph 1 includes the pump unit 3A, the autosampler unit 3B, the column unit 3C and the detector unit 3D as the units 3, by way of example. Further, each unit 3 behaves independently because a parameter, a status or detection data are shared among units, by way of example. The liquid chromatograph 1 may include another function unit and may share data with the other function unit.

Each unit 3 included in the liquid chromatograph 1 may be contained in each casing, or all of the units 3 may be contained in one casing. In a case where each unit 3 is contained in each casing, the liquid chromatograph 1 is constituted by a combination of a plurality of casings.

While preferred embodiments of the present invention have been described above, it is to be understood that variations and modifications will be apparent to those skilled in the art without departing the scope and spirit of the present invention. The scope of the present invention, therefore, is to be determined solely by the following claims.

(7) Aspects

It is understood by those skilled in the art that the plurality of above-mentioned illustrative embodiments are specific examples of the below-mentioned aspects.

(Item 1) A liquid chromatograph according to one aspect may include a plurality of units that execute each function of the liquid chromatograph, and a system controller connected to the plurality of units, wherein the system controller may include a status provider that acquires a status from any unit and provides the acquired status to a computer connected to the system controller, a data accumulator that accumulates the status to be provided to the computer in a database, and a data provider that provides the status accumulated in the database to any unit.

Each unit can acquire the status of another unit. Thus, each unit can behave independently in accordance with the status of the other unit, and a load applied to the system controller can be reduced.

(Item 2) In the liquid chromatograph described in the item 1, the system controller may further include a parameter assigner that acquires a parameter from the computer and provides the acquired parameter to a unit for which the parameter is to be set, and the data accumulator may accumulate the parameter to be provided to the unit for which the parameter is to be set in the database, and the data provider may provide the parameter accumulated in the database to any unit.

Each unit can acquire a parameter of another unit. Thus, each unit can behave independently in accordance with a parameter set for the other unit, and a load applied to the system controller can be reduced.

(Item 3) In the liquid chromatograph described in the item 1, the system controller may further include a detection data provider that acquires detection data from a detector unit and provides the acquired detection data to the computer, and the data accumulator may accumulate the detection data to be provided to the computer, and the data provider may provide the detection data accumulated in the database to any unit.

Each unit can acquire the detection data. Thus, each unit can behave independently in accordance with the detection data, and a load applied to the system controller can be reduced.

(Item 4) In the liquid chromatograph described in the item 1, the data provider may provide data accumulated in the database to any unit that has made a request in response to the request made by the unit.

Each unit can acquire data accumulated in the database as necessary. Thus, each unit can behave independently in accordance with the data accumulated in the database, and a load applied to the system controller can be reduced.

(Item 5) In the liquid chromatograph described in the item 1, the data accumulator may assign a unique ID to each data accumulated in the database.

Each unit can acquire desired data from the data accumulated in the database by designating the unique ID.

(Item 6) In the liquid chromatograph described in the item 1, the plurality of units may include a pump unit having a liquid sending pump that sends a mobile phase into an analysis flow path, and a column unit that contains a separation column and adjusts a temperature of the separation column to a target temperature, the pump unit may include a liquid sending controller that controls behavior of the liquid sending pump such that a flow rate of a mobile phase flowing through the analysis flow path is the target flow rate, and a protection flow rate setter that sets a protection flow rate that is lower than the target flow rate in order to protect the separation column, when the target flow rate is set, the column unit may include a temperature detector that detects a temperature in the column unit, the data accumulator may accumulate temperature data of the column unit that is acquired from the column unit as the status in the database, the data provider may provide the temperature data to the pump unit, and the liquid sending controller may control behavior of the pump unit based on the temperature data acquired from the system controller such that a flow rate of a mobile phase flowing through the analysis flow path does not exceed the protection flow rate until a temperature of the column unit reaches the target temperature, when the pump unit starts sending the mobile phase.

The pump unit can control the liquid sending pressure of the mobile phase independently by acquiring the temperature data of the column unit. Thus, a load applied to the system controller can be reduced.

(Item 7) In the liquid chromatograph described in the item 1, the plurality of units may include an autosampler unit that has a sampling flow path for holding a sample temporarily, is selectively switched between an injecting mode in which the sampling flow path is incorporated into an analysis flow path of the liquid chromatograph and a loading mode in which the sampling flow path is not incorporated into the analysis flow path, and injects a sample into the analysis flow path by being put in the injecting mode with the sample flow path holding a sample, and a pump unit that sends a mobile phase into the analysis flow path, the pump unit may include a pressure detector that detects a liquid sending pressure of a mobile phase sent into the analysis flow path, the data accumulator may accumulate liquid sending pressure data acquired from the pump unit as the status in the database, the data provider may provide the liquid sending pressure data to the autosampler unit, the autosampler unit may include a determiner that obtains a variation value of the liquid sending pressure data when the autosampler unit is switched between the injection mode and the loading mode, based on the liquid sending pressure data acquired from the system controller, and determines presence or absence of clogging in a system incorporated into the analysis flow path in the injecting mode based on the obtained variation value.

The autosampler unit can independently make determination about clogging in the flow path by acquiring the liquid sending pressure data of the pump unit. Thus, a load applied to the system controller can be reduced.

The invention claimed is:
1. A liquid chromatograph comprising:
a plurality of units that execute each function of the liquid chromatograph; and
a system controller connected to the plurality of units, wherein:
the system controller includes
a status provider that acquires a status from any unit and provides the acquired status to a computer connected to the system controller,
a data accumulator that accumulates the status to be provided to the computer in a database, and
a data provider that provides the status accumulated in the database to any unit;
the plurality of units include:
a pump unit having a liquid sending pump that sends a mobile phase into an analysis flow path, and
a column unit that contains a separation column and adjusts a temperature of the separation column to a target temperature,
the pump unit includes:
a liquid sending controller that controls behavior of the liquid sending pump such that a flow rate of a mobile phase flowing through the analysis flow path is the target flow rate, and
a protection flow rate setter that sets a protection flow rate that is lower than the target flow rate in order to protect the separation column, when the target flow rate is set, the column unit includes a temperature detector that detects a temperature in the column unit, the data accumulator accumulates temperature data of the column unit that is acquired from the column unit as the status in the database, the data provider provides the temperature data to the pump unit, and the liquid sending controller controls behavior of the pump unit based on the temperature data acquired from the system controller such that a flow rate of a mobile phase flowing through the analysis flow path does not exceed the protection flow rate until a temperature of the column unit reaches the target temperature, when the pump unit starts sending the mobile phase.

2. The liquid chromatograph according to claim 1, wherein the system controller further includes a parameter assigner that acquires a parameter from the computer and provides the acquired parameter to a unit for which the parameter is to be set, and the data accumulator accumulates the parameter to be provided to the unit for which the parameter is to be set in the database, and the data provider provides the parameter accumulated in the database to any unit.

3. The liquid chromatograph according to claim 1, wherein the system controller further includes a detection data provider that acquires detection data from a detector unit and provides the acquired detection data to the computer, and the data accumulator accumulates the detection data to be provided to the computer, and the data provider provides the detection data accumulated in the database to any unit.

4. The liquid chromatograph according to claim 1, wherein the data provider provides data accumulated in the database to any unit that has made a request in response to the request made by the unit.

5. The liquid chromatograph according to claim 1, wherein the data accumulator assigns a unique ID to each data accumulated in the database.

6. A liquid chromatograph comprising:

a plurality of units that execute each function of the liquid chromatograph; and a system controller connected to the plurality of units, wherein:

the system controller includes a status provider that acquires a status from any unit and provides the acquired status to a computer connected to the system controller, a data accumulator that accumulates the status to be provided to the computer in a database, and a data provider that provides the status accumulated in the database to any unit;

the plurality of units include:

an autosampler unit that has a sampling flow path for holding a sample temporarily, is selectively switched between an injecting mode in which the sampling flow path is incorporated into an analysis flow path of the liquid chromatograph and a loading mode in which the sampling flow path is not incorporated into the analysis flow path, and injects a sample into the analysis flow path by being put in the injecting mode with the sample flow path holding a sample, and a pump unit that sends a mobile phase into the analysis flow path, the pump unit includes a pressure detector that detects a liquid sending pressure of a mobile phase sent into the analysis flow path, the data accumulator accumulates liquid sending pressure data acquired from the pump unit as the status in the database, the data provider provides the liquid sending pressure data to the autosampler unit, and the autosampler unit includes a determiner that obtains a variation value of the liquid sending pressure data when the autosampler unit is switched between the injection mode and the loading mode, based on the liquid sending pressure data acquired from the system controller, and determines presence or absence of clogging in a system incorporated into the analysis flow path in the injecting mode based on the obtained variation value.

7. The liquid chromatograph according to claim 6, wherein the system controller further includes a parameter assigner that acquires a parameter from the computer and provides the acquired parameter to a unit for which the parameter is to be set, and the data accumulator accumulates the parameter to be provided to the unit for which the parameter is to be set in the database, and the data provider provides the parameter accumulated in the database to any unit.

8. The liquid chromatograph according to claim 6, wherein the system controller further includes a detection data provider that acquires detection data from a detector unit and provides the acquired detection data to the computer, and the data accumulator accumulates the detection data to be provided to the computer, and the data provider provides the detection data accumulated in the database to any unit.

9. The liquid chromatograph according to claim 6, wherein the data provider provides data accumulated in the database to any unit that has made a request in response to the request made by the unit.

10. The liquid chromatograph according to claim 6, wherein the data accumulator assigns a unique ID to each data accumulated in the database.

* * * * *